United States Patent
Takanashi

(10) Patent No.: US 8,062,391 B2
(45) Date of Patent: Nov. 22, 2011

(54) METHOD FOR PURIFYING BIODIESEL FUEL

(75) Inventor: Hirokazu Takanashi, Kagoshima (JP)

(73) Assignee: Kagoshima University, Kagoshima (JP)

( * ) Notice: Subject to any disclaimer, the term of this patent is extended or adjusted under 35 U.S.C. 154(b) by 353 days.

(21) Appl. No.: 11/816,335

(22) PCT Filed: Feb. 17, 2006

(86) PCT No.: PCT/JP2006/302814
§ 371 (c)(1),
(2), (4) Date: Sep. 17, 2007

(87) PCT Pub. No.: WO2006/088123
PCT Pub. Date: Aug. 24, 2006

(65) Prior Publication Data
US 2009/0025277 A1      Jan. 29, 2009

(30) Foreign Application Priority Data
Feb. 21, 2005    (JP) .................. 2005-043951

(51) Int. Cl.
*C10L 1/19* (2006.01)
*C07B 63/00* (2006.01)

(52) U.S. Cl. .......... 44/904; 44/385; 44/389; 210/748.01

(58) Field of Classification Search ............ 44/300–302, 44/388, 904, 394, 695, 208, 285, 286, 287, 44/288, 605, 905; 205/695, 440, 441; 554/124, 554/169, 174; 210/600, 748.01, 748.16, 210/748.17
See application file for complete search history.

(56) References Cited

U.S. PATENT DOCUMENTS

| | | | | |
|---|---|---|---|---|
| 284,862 A | * | 9/1883 | Lackersteen | 205/352 |
| 5,352,343 A | * | 10/1994 | Bailes et al. | 204/564 |
| 2002/0121352 A1 | | 9/2002 | Lawson | |
| 2005/0081435 A1 | * | 4/2005 | Lastella | 44/605 |
| 2005/0120621 A1 | * | 6/2005 | Lawson et al. | 44/388 |
| 2006/0236598 A1 | * | 10/2006 | Selvidge | 44/388 |

FOREIGN PATENT DOCUMENTS

DE    196 22 601 C1    3/1998

(Continued)

OTHER PUBLICATIONS

Takahito Hirano et al., "Purification of Biodiesel Fuel by Application of High Voltage", The Society of Chemical Engineers, Japan Kenkyu Happyo Koen Yoshishu, Feb. 22, 2005, pp. 780 w/English translation.

(Continued)

*Primary Examiner* — Cephia D Toomer
*Assistant Examiner* — Pamela H Weiss
(74) *Attorney, Agent, or Firm* — Stephen A. Bent; Foley & Lardner LLP

(57) ABSTRACT

Provided is a method for purifying a biodiesel fuel while completely preventing or greatly reducing generation of waste water. The present invention relates to a method for purifying a biodiesel fuel characterized by applying an electric field to or heating a crude biodiesel fuel and a method for purifying a biodiesel fuel characterized by adding water (preferably containing a demulsifier such as an inorganic calcium salt or a magnesium salt) to a crude biodiesel fuel to form W/O emulsion, and breaking the emulsion by application of an electric field or heating, etc.

12 Claims, 12 Drawing Sheets

Apparatus (scale of 0.1 L) for use in application of a high electric field

FOREIGN PATENT DOCUMENTS

| | | |
|---|---|---|
| JP | 58-3606 | 1/1983 |
| JP | 2002-69476 | 8/2000 |
| JP | 2002-332491 | 5/2001 |
| JP | 2004-067937 | 3/2004 |
| WO | WO 94/17027 A | 8/1994 |

OTHER PUBLICATIONS

Y. Zhang et al., "Biodiesel production from waste cooking oil: 1. Process design and technological assessment", Bioresource Technology 89 (2003) 1-16.

Mohammad I. Al-Widyan et al., "Experimental evaluation of the transesterification of waste palm oil into biodiesel", Bioresource Technology 85 (2002) 253-256.

Fangrui Ma et al., "Biodiesel production: a review", Bioresource Technology 70 (1999)1-15.

Supplementary European Search Report EP 06 71 3955 dated Jan. 22, 2010.

Database WPI Week 200345 Thomas Scientific London, GB; AN 2003-472237 XP002483046 & JP 2002 332491 A (NULL) Nov. 22, 2002, *Abstract.

* cited by examiner

Removal of potassium

Removal of methanol

Removal of methanol

Removal of free glycerin

Removal of methanol

Removal of potassium

Removal of free glycerin

Removal of methanol

Removal of potassium

Removal of free glycerin

METHOD FOR PURIFYING BIODIESEL FUEL

TECHNICAL FIELD

The present invention relates to a method for purifying a biodiesel fuel.

BACKGROUND ART

Recently, a biodiesel fuel (BDF) such as long-chain fatty acid methyl ester derived from a recyclable lipid has been attracted attention as recyclable clean energy. The most common method presently used for producing a biodiesel fuel is a transesterification method using an alkaline catalyst. However, the alkaline catalyst method has a problem in that the generated ester compound contains unreacted methanol and alkali metals (e.g., potassium or sodium) and a by-product such as free glycerin. To overcome this problem, purification by washing with water (for example, Patent Document 1) is generally performed. However, in this method, high cost and large energy are required for treating wastewater. In the circumstances, it has been desired to develop a method for producing a biodiesel fuel completely preventing or greatly reducing generation of wastewater.

Patent Document 1: JP Patent Publication (Kokai) No. 10-182518A (1998)

DISCLOSURE OF THE INVENTION

An object of the present invention is to provide a method for producing a biodiesel fuel completely preventing or greatly reducing generation of wastewater.

The gist of the present invention is as described below.

(1) A method for purifying a biodiesel fuel characterized in that an electric field is applied to a crude biodiesel fuel.

(2) The method according to item (1), wherein the electric field is applied at an electric-field intensity of 0.01 to 5 kV/cm.

(3) The method according to item (1), wherein the electric field is applied at an electric-field intensity of 0.1 to 2.5 kV/cm.

(4) The method according to any one of items (1) to (3), wherein the crude biodiesel fuel contains methanol in an amount of 100 to 3500 mg/L.

(5) The method according to any one of items (1) to (4), wherein the crude biodiesel fuel comprises alkali metals in an amount of 5 to 200 mg/L.

(6) The method according to any one of items (1) to (5), wherein the crude biodiesel fuel comprises free glycerin in an amount of 200 to 800 mg/L.

(7) A method for purifying a biodiesel fuel characterized by comprising heating a crude biodiesel fuel.

(8) The method according to item (7), wherein the heating temperature is 60 to 110° C.

(9) The method according to item (7), wherein the heating temperature is 70 to 95° C.

(10) The method according to any one of items (7) to (9), wherein the crude biodiesel fuel comprises methanol in an amount of 100 to 3500 mg/L.

(11) The method according to any one of items (7) to (10), wherein the crude biodiesel fuel comprises alkali metals in an amount of 5 to 200 mg/L.

(12) The method according to any one of items (7) to (11), wherein the crude biodiesel fuel comprises free glycerin in an amount of 200 to 800 mg/L.

(13) A method for purifying biodiesel fuel, characterized by comprising adding water to a crude biodiesel fuel to form W/O emulsion, followed by breaking the emulsion.

(14) The method according to item (13), wherein the emulsion is broken by applying an electric field.

(15) The method according to item (13), wherein the emulsion is broken by heating.

(16) The method according to any one of items (13) to (15), wherein water is added in an amount of 0.01 to 5 v/v % to the crude biodiesel fuel.

(17) The method according to item (16), wherein water is added in an amount of 0.5 to 3 v/v % to the crude biodiesel fuel.

(18) The method according to any one of items (13) to (15), wherein the water to be added to the crude biodiesel fuel comprises a demulsifier.

(19) The method according to item (18), wherein water comprising a demulsifier is added in an amount of 0.01 to 1 v/v % to the crude biodiesel fuel.

(20) The method according to item (18), wherein water comprising a demulsifier is added in an amount of 0.1 to 0.5 v/v % to the crude biodiesel fuel.

(21) The method according to item (18), characterized by comprising adding water comprising a demulsifier to the crude biodiesel fuel to form W/O emulsion, allowing a soap component contained in the biodiesel fuel and the demulsifier to form an insoluble salt, and separating the insoluble salt by precipitation, thereby losing a surface activity to break the emulsion.

(22) The method according to any one of items (18) to (21), wherein the demulsifier is an inorganic calcium salt or magnesium salt.

(23) The method according to any one of items (13) to (22), wherein the crude biodiesel fuel comprises methanol in an amount of 100 to 20000 mg/L.

(24) The method according to any one of items (13) to (23), wherein the crude biodiesel fuel comprises alkali metals in an amount of 5 to 200 mg/L.

(25) The method according to any one of items (13) to (24), wherein the crude biodiesel fuel comprises free glycerin in an amount of 200 to 2000 mg/L.

According to the present invention, it is possible to completely prevent or greatly reduce generation of wastewater and remove impurities such as methanol, alkali metals (e.g., potassium or sodium) and a by-product such as free glycerin from a biodiesel fuel.

BEST MODE FOR CARRYING OUT THE INVENTION

The crude biodiesel fuel to be used in the present invention is not particularly limited and includes, for example, a crude biodiesel fuel obtained by a transesterification method using an alkaline catalyst. Preferably, use may be made of a crude biodiesel fuel obtained by roughly separating a by-product glycerin by a gravity separation process in advance and roughly separating excessive methanol by heat process. Examples of the raw material oil for a biodiesel fuel include, but not particularly limited to, waste edible oil, fresh oil derived from a biomass product, rapeseed oil, safflower oil, soybean oil, palm oil and salad oil.

A first invention of the present application is directed to a method for purifying a biodiesel fuel, characterized by applying an electric field to a crude biodiesel fuel.

In the electric field application process according to the first invention of the present application, a voltage of preferably 0.01 to 5 kV/cm, and further preferably, 0.1 to 2.5 kV/cm is applied. The time period of electric field application is generally 1 to 360 minutes, preferably 1 to 180 minutes, and further preferably, 1 to 15 minutes. In the electric field application process, either a pulse electric field or an alternative-current electric field may be used. In the case of the pulse electric field, a wave-front-time of the pulse is preferably 1.5 to 20 ms, whereas, in the case of the alternative-current electric field, an extremely low frequency wave (about 50 to 600 Hz) is preferable.

After the application of an electric field, a fuel phase and a waste-liquid phase are separated to obtain a purified biodiesel fuel.

A crude biodiesel fuel containing methanol (100 to 3500 mg/L, preferably 100 to 2500 mg/L), alkali metals such as potassium or sodium (5 to 200 mg/L, preferably 5 to 150 mg/L) and free glycerin (200 to 800 mg/L, preferably 200 to 500 mg/L) can be purified only by applying an electric field as mentioned above.

In the first invention of the present application, purification efficiency can be improved by adding water to a crude biodiesel fuel to form W/O emulsion before an electric field is applied, followed by applying the electric field to break the emulsion. It is effective to purify a crude biodiesel fuel particularly produced from waste edible oil by adding water externally from the system to form a W/O emulsion, followed by applying an electric field, as described above.

A second invention of the present application is directed to a method for purifying a biodiesel fuel characterized by comprising heating a crude biodiesel fuel.

The heating temperature in the heat process is preferably 60 to 110° C. and further preferably 70 to 95° C. in view of purification efficiency and economy. The heating time is preferably 30 minutes to 16 hours and further preferably 1 to 3 hours in view of purification efficiency and economy.

A crude biodiesel fuel containing methanol (100 to 3500 mg/L), alkali metals such as potassium or sodium (5 to 200 mg/L) and free glycerin (200 to 800 mg/L) can be purified only by heating as mentioned above.

A third invention of the present application is directed to a method for purifying a biodiesel fuel characterized by adding water to a crude biodiesel fuel to form W/O emulsion, followed by breaking the emulsion.

In the third invention of the present application, it is possible to purify a crude biodiesel fuel by adding water to a crude biodiesel fuel to form a W/O emulsion, followed by breaking the emulsion. It is effective to purify a crude biodiesel fuel particularly produced from waste edible oil by adding water externally from the system to form a W/O emulsion, followed by breaking the emulsion, as described above.

The addition amount of water to be used for forming the W/O emulsion is preferably 0.01 to 5 v/v % and further preferably 0.5 to 3 v/v %. The phrase "the addition amount of water is 3 v/v %" used herein means the amount of water when a crude biodiesel fuel and water are mixed in a volumetric ratio of 97:3. Formation of emulsion can be performed by shaking or stirring.

Examples of water to be added to a crude biodiesel fuel preferably include pure water, purified water, distilled water, tap water, and ground water, which are substantially free from alkali metal, glycerin and methanol, and further preferably, contain a demulsifier. When water containing a demulsifier is added to a crude biodiesel fuel, an insoluble salt is formed from a soap component and the demulsifier contained in the biodiesel fuel and separated by precipitation. As a result, since a surface activity disappears, emulsion can be easily broken. In addition, the amount of water to be added to the crude biodiesel fuel can be reduced.

The demulsifier used in the invention is a substance capable of reacting with a soap component such as potassium soap or sodium soap present in a crude biodiesel fuel to form an insoluble component such as metal soap, as well as a component having a function of reducing surface active function of a surfactant such as soap contributing to stabilization of W/O emulsion. The demulsifier to be used in the invention may not particularly limited as long as it is a metal salt capable of converting potassium soap or sodium soap into insoluble metal soap. Specific examples thereof include inorganic or organic calcium salts and magnesium salts; preferably calcium salts or magnesium salts of inorganic acids such as nitric acid, hydrochloric acid, phosphoric acid and sulfuric acid and calcium salts or magnesium salts of organic acids such as formic acid, acetic acid and lactic acid; further preferably, calcium salts or magnesium salts of nitric acid and hydrochloric acid.

A demulsifier is used in a sufficient amount preferably for reacting with a soap component contained in a crude biodiesel fuel to produce insoluble metal soap, further preferably for satisfying a stoichiometrical ratio of reacting with a soap component contained in a crude biodiesel fuel to form insoluble metal soap.

When a demulsifier is stoichiometrically added, the demulsifier does not virtually present (less than 5 mg/L) in a purified biodiesel fuel. Thus, removal of the remaining demulsifier is virtually not necessitated. When a demulsifier is excessively added, the concentration of a remaining demulsifier sometimes becomes 5 mg/L or more. In this case, after the metal soap, which was produced by adding the demulsifier, is removed by gravity separation, a free fatty acid such as linoleic acid or oleic acid is added in an amount of generally 0.01 to 0.25 v/v %, preferably 0.01 to 0.1 v/v %, and further preferably, 0.01 to 0.05 v/v %. In this manner, the remaining demulsifier is converted into insoluble metal soap, which can be removed by membrane filtration or the like.

When water to be added to a crude biodiesel fuel contains a demulsifier, the water containing the demulsifier is preferably added in an amount of 0.01 to 1 v/v %, and further preferably, 0.1 to 0.5 v/v %. The phrase "the addition amount of water is 1 v/v %" used herein means the addition amount of water containing a demulsifier when a crude biodiesel fuel and water containing a demulsifier are mixed in a volumetric ratio of 99:1. Emulsion can be formed by shaking or stirring.

The demulsification used in the invention refers to making a homogeneous phase or forming a phase close to a homogeneous phase by integrating discontinuous-phase liquid drops with each other to liquid drops larger in diameter to render the discontinuous-phase instable, thereby eliminating it. Preferred examples of a demulsification method may include electric-field application, heating and addition of a demulsifier, as mentioned above.

The heating temperature in the aforementioned heat process is preferably 60 to 110° C., and further preferably, 70 to 95° C. in view of purification efficiency and economy. The heating time is preferably 30 minutes to 16 hours, and further preferably, 1 to 3 hours in view of purification efficiency and economy.

In a crude biodiesel fuel, discontinuous phases, which are formed of a glycerin phase having potassium and the like concentrated therein, are generally dispersed in ester compounds (biodiesel fuel). When water is externally added to the dispersed phase, W/O emulsion is formed (by emulsification). More specifically, water added there and glycerin form a homogeneous phase and the diameters of liquid drops conceivably increase. When heat treatment is performed subsequently, the viscosity of the ester compounds (biodiesel fuel) decreases, with the result that the sedimentation rate of the liquid drops increases and the liquid drops are conceivably integrated to each other at the bottom of a process container.

After the demulsification, a fuel phase and waste-liquid phase are separated. In this manner, a purified biodiesel fuel can be obtained.

If the emulsification/demulsification cycle of W/O emulsion according to the third invention of the present application is repeated at least twice, degree of purification can be improved.

According to the third invention of the present application, it is possible to purify a crude biodiesel fuel containing methanol (100 to 20000 mg/L), alkali metals such as potassium or sodium (5 to 200 mg/L) and free glycerin (200 to 2000 mg/L).

The principal of purification by demulsification may be estimated as follows: In the demulsification by application of an electric field, application of the electric field causes dielectric polarization of glycerin liquid drops (liquid drops of water/glycerin mixture when water is added). When the polarity of applied electric field is varied, the liquid drops are shaken. As a result, the liquid drops collide with each other and integrate with each other to form liquid drops larger in diameter. The liquid drops are separated by gravity in accordance with the Stokes' theorem.

In the demulsification by the heat process, the vibration of glycerin liquid drops (liquid drops of water/glycerin mixture when water is added) is increased by heating. As a result, the frequency of collision of glycerin drops increases, thereby removing the droplets. In addition, since the viscosity of the continuous phase decreases, the sedimentation rate increases.

Since methanol and alkali metals such as potassium are distributed in a glycerin phase (liquid drops of water/glycerin mixture when water is added) (Chuang-Wei Chiu et al., Bioengineering, Food, and Natural Products, AIChE Journal, 51(4), 1274-1278 (2005)), methanol and alkali metals such as potassium can be simultaneously removed by removing the glycerin phase (liquid drops of water/glycerin mixture when water is added).

This description includes part or all of the contents as disclosed in the description of and/or drawings Japanese Patent Application No. 2005-43951, which is a priority document of the present application.

EXAMPLES

The present invention will be now described by way of examples; however, the scope of the invention will not be limited to these examples.

Example 1

Figure 1:
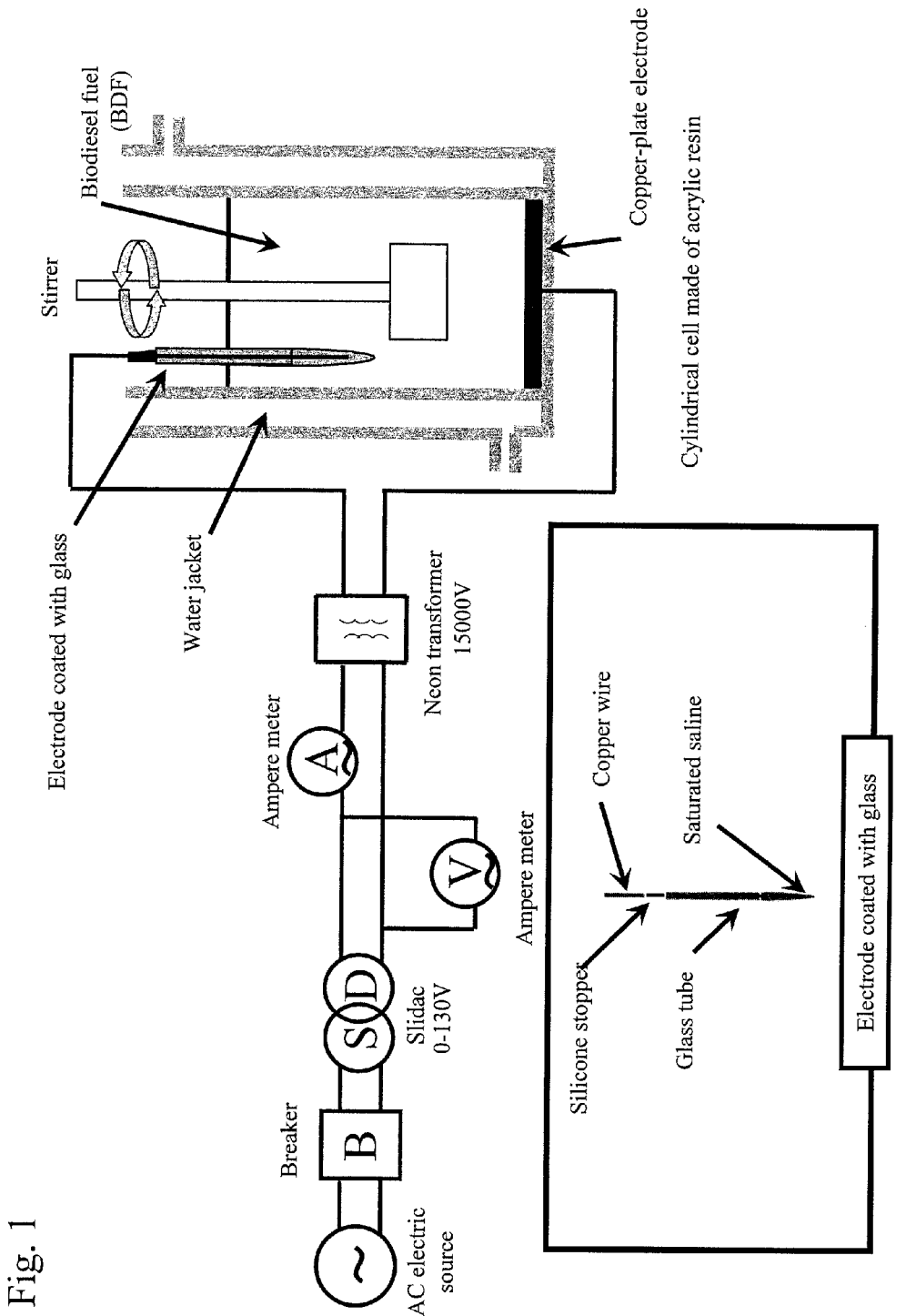
FIG. 1 is a schematic illustration of an apparatus for use in application of a high electric field.
Figure 2:
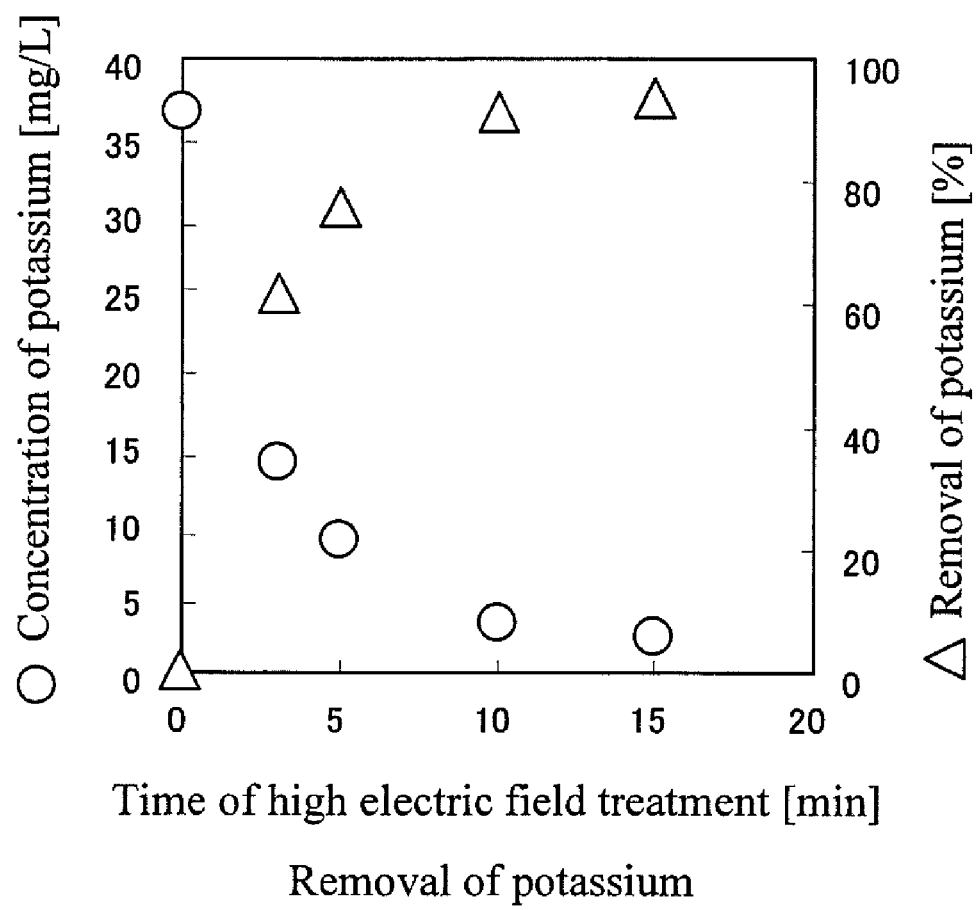
FIG. 2 is a graph showing the relationship between electric field application time and the concentration and removal of potassium.
Figure 3:
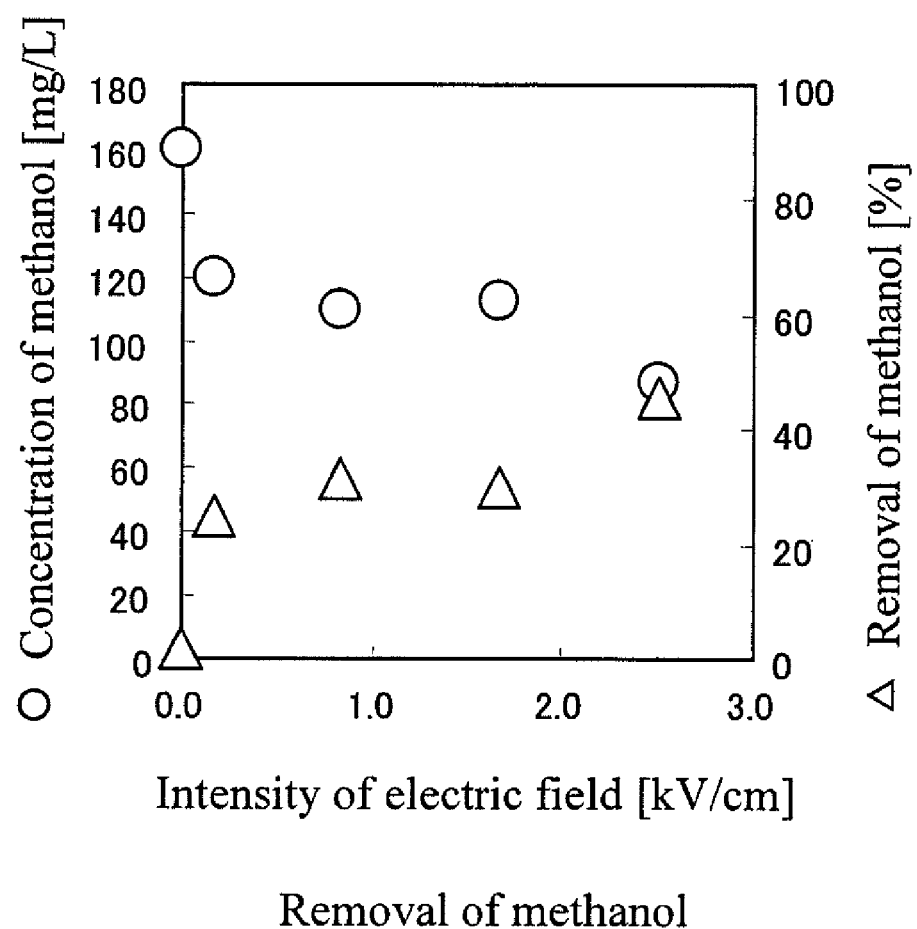
FIG. 3 is a graph showing the relationship between the intensity of the electric field, and the concentration and removal of methanol.

A crude biodiesel fuel (methanol: 3100 mg/L, potassium: 37 mg/L, free glycerin: 284 mg/L), which was produced from fresh oil (rapeseed oil) by a transesterification method (using methanol and potassium hydroxide), or a crude biodiesel fuel (methanol: 160 mg/L, potassium: 114 mg/L, free glycerin: 384 mg/L), which was produced from waste edible oil (salad oil) by a transesterification method (using methanol and potassium hydroxide), was placed in a cylindrical container made of an acrylic resin. A high electric field was applied by using the apparatus shown in FIG. 1. The intensity of the electric field was varied within the range of 0.16 to 2.5 kV/cm. As a result, when an electric field as high as 2.5 kV/cm was applied to the crude biodiesel fuel produced from the fresh oil, potassium was removed with the passage of time and reached a final concentration of 2.3 mg/L, which met the EU standard: 5.0 mg/L (FIG. 2) 15 minutes after initiation of the application. Also removal effects of ethanol and free glycerin were confirmed. When the crude biodiesel fuel produced from the waste edible oil was used, removal effects of methanol, potassium and free glycerin were also confirmed. The relationship between the intensity of the electric field applied to the crude biodiesel fuel produced from the waste edible oil and the final concentration and removal of methanol is shown in FIG. 3.

Potassium contained in the oil phase after treatment was analyzed by an ion selective electrode or flame atomic absorption spectrometry. When the ion selective electrode was used for analysis, potassium was extracted by 0.1N hydrochloric acid of the same volume as that of a biodiesel fuel and an aqueous phase was used as a sample solution. On the other hand, when the flame atomic adsorption spectrometry was used, the oil after treatment was dissolved with methanol and used as a sample solution. When methanol and free glycerin contained in the oil phase were analyzed, a gas chromatograph mass spectrometer was used. The pretreatment was performed in accordance with a method of Mittelbach et al. (Mittelbach et al., Chromatographia, 42, 431 (1996)).

Example 2

A crude biodiesel fuel (methanol: 2620 mg/L, potassium: 114 mg/L, and free glycerin: 1320 mg/L), which was produced from waste edible oil (salad oil) by a transesterification method (using methanol and potassium hydroxide), and pure water were placed in a glass bottle in a total amount of 100 mL. The bottle was shaken to form emulsion. Immediately upon emulsion formation, the emulsion was transferred to a cylindrical container formed of an acrylic resin and high electric field was applied in the same manner as in Example 1.

Figure 4:
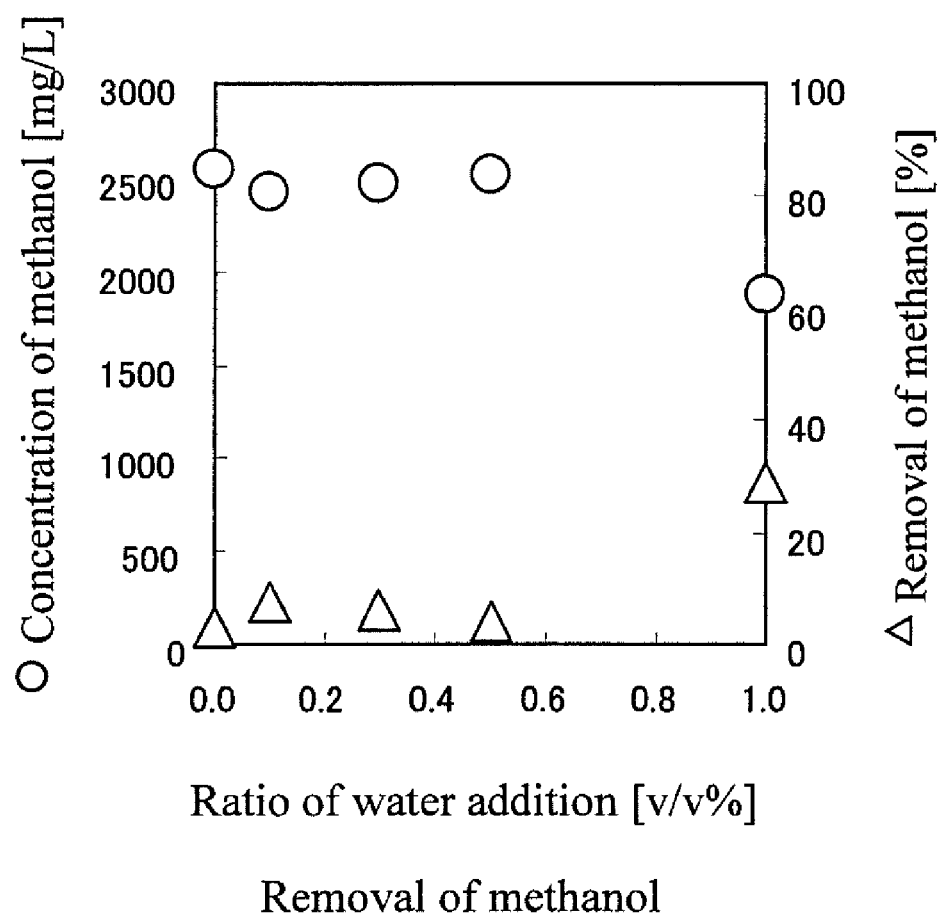
FIG. 4 is a graph showing the concentration and removal of methanol as the ratio of water addition changes.
Figure 5:
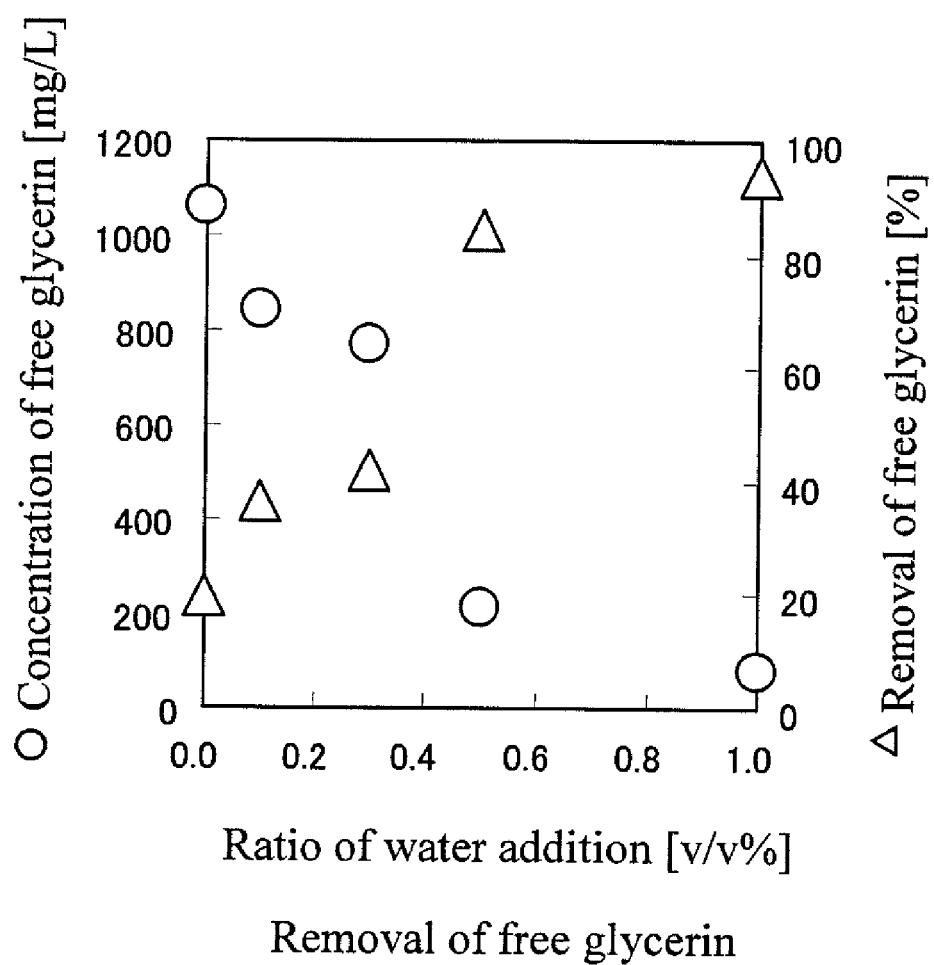
FIG. 5 is a graph showing the concentration and removal of free glycerin as the ratio of water addition changes.

When the ratio of water addition was varied within the range of 0 to 1.0 v/v %, the final concentration and removal of methanol and free glycerin are shown in FIGS. 4 and 5, respectively. Removal effects of methanol and free glycerin were confirmed. Furthermore, it was found that the removal increases as the ratio of water addition increases. A removal of free glycerin was 94.1% at a water addition of 1.0 v/v %.

Figure 6:
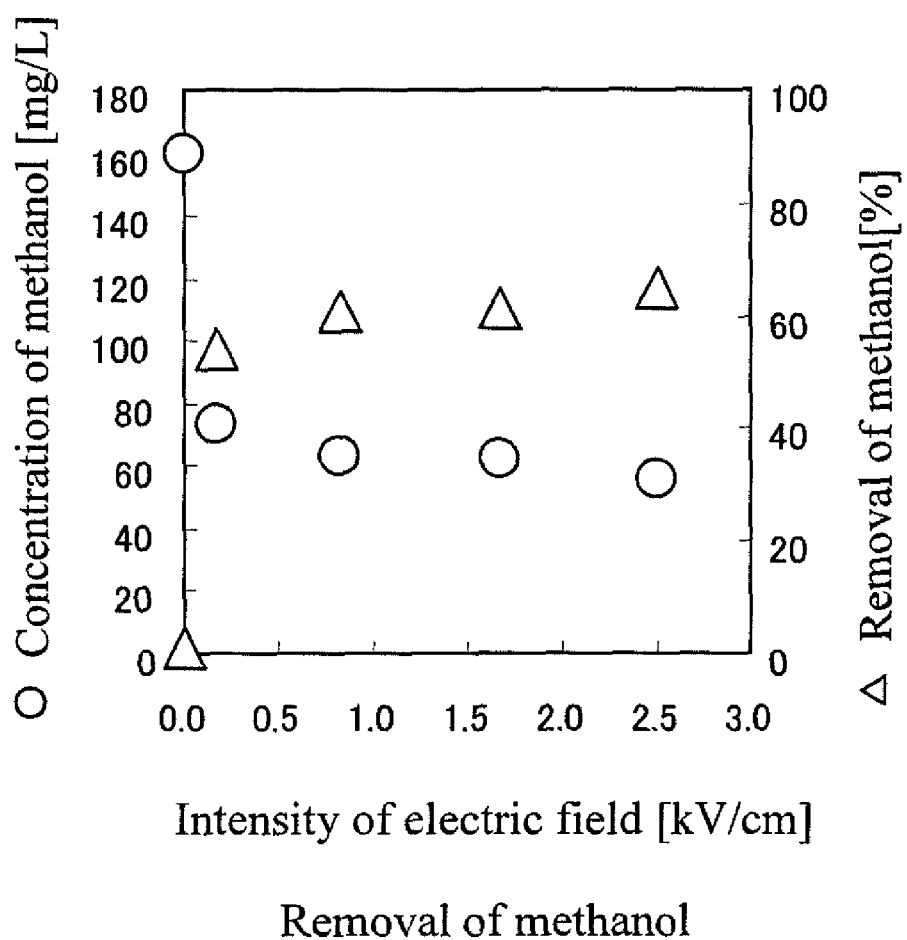
FIG. 6 is a graph showing the concentration and removal of methanol as the intensity of electric field changes.
Figure 7:
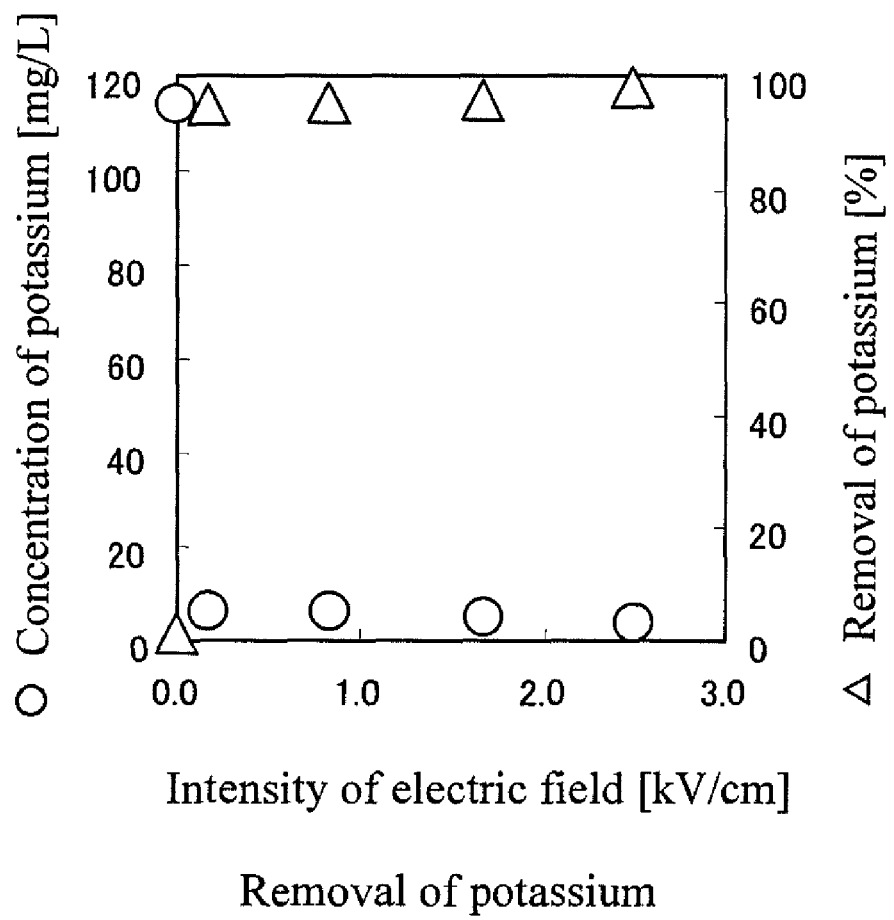
FIG. 7 is a graph showing the concentration and removal of potassium as the intensity of electric field changes.
Figure 8:
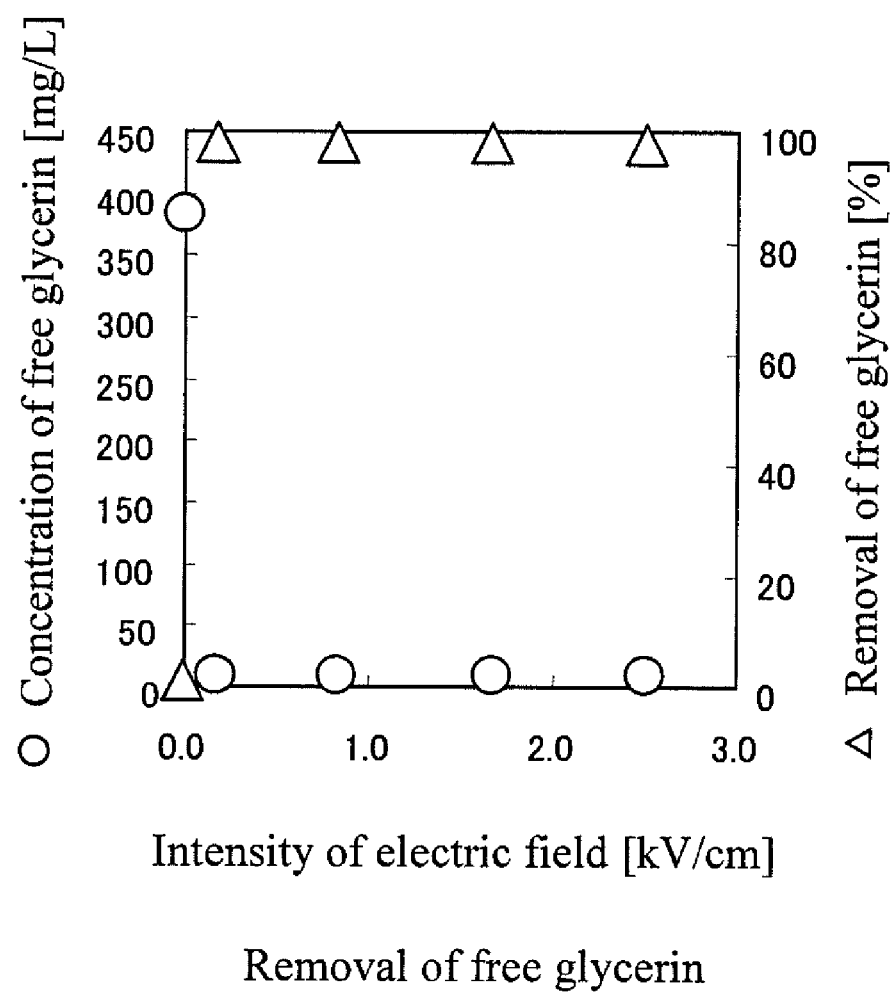
FIG. 8 is a graph showing the concentration and removal of free glycerin as the intensity of electric field changes.

A crude biodiesel fuel (methanol: 160 mg/L, potassium: 114 mg/L, and free glycerin: 384 mg/L), which was produced from waste edible oil (salad oil) by a transesterification method (using methanol and potassium hydroxide), was used to form emulsion having water in an addition rate of 1.0 v/v %. Purification of the emulsion was performed by varying the intensity of electric field. The final concentration and removal of methanol, potassium and free glycerin are shown in FIGS. 6 to 8, respectively. Impurities such as methanol, potassium and free glycerin were all removed by application of an electric field having an intensity of 0.16 to 2.5 kV/cm. The maximum removal thereof reached 65.0%, 96.7% and 97.4%, respectively.

Example 3

First, 97 mL of a crude biodiesel fuel (methanol: 272 mg/L, potassium: 197 mg/L, and free glycerin: 574 mg/L), which was produced from waste edible oil (salad oil) by a transesterification method (using methanol and potassium hydroxide), and 3 mL of pure water were placed in a glass bottle and the bottle was shaken to form emulsion. Immediately upon emulsion formation, the emulsion was transferred to a cylindrical container formed of an acrylic resin. An electric field having an intensity of 2.5 kV/cm was applied for one hour in the same manner as in Example 1 and then allowed to stand still for 12 hours. The concentrations of methanol, potassium and free glycerin in the fuel phase were determined.

Figure 9:
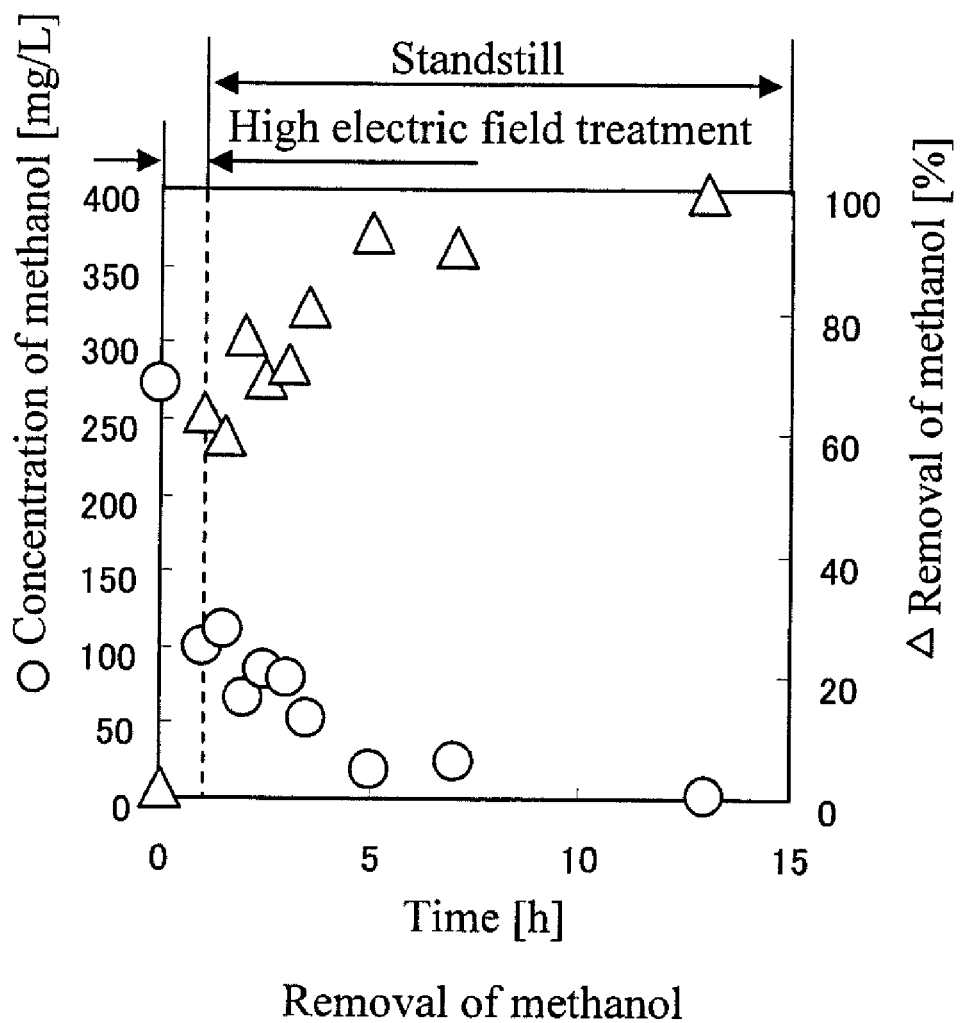
FIG. 9 is a graph showing the timecourse and removal of methanol when a high electric field is applied for one hour to a biodiesel fuel and allowed the fuel to stand for 12 hours.
Figure 10:
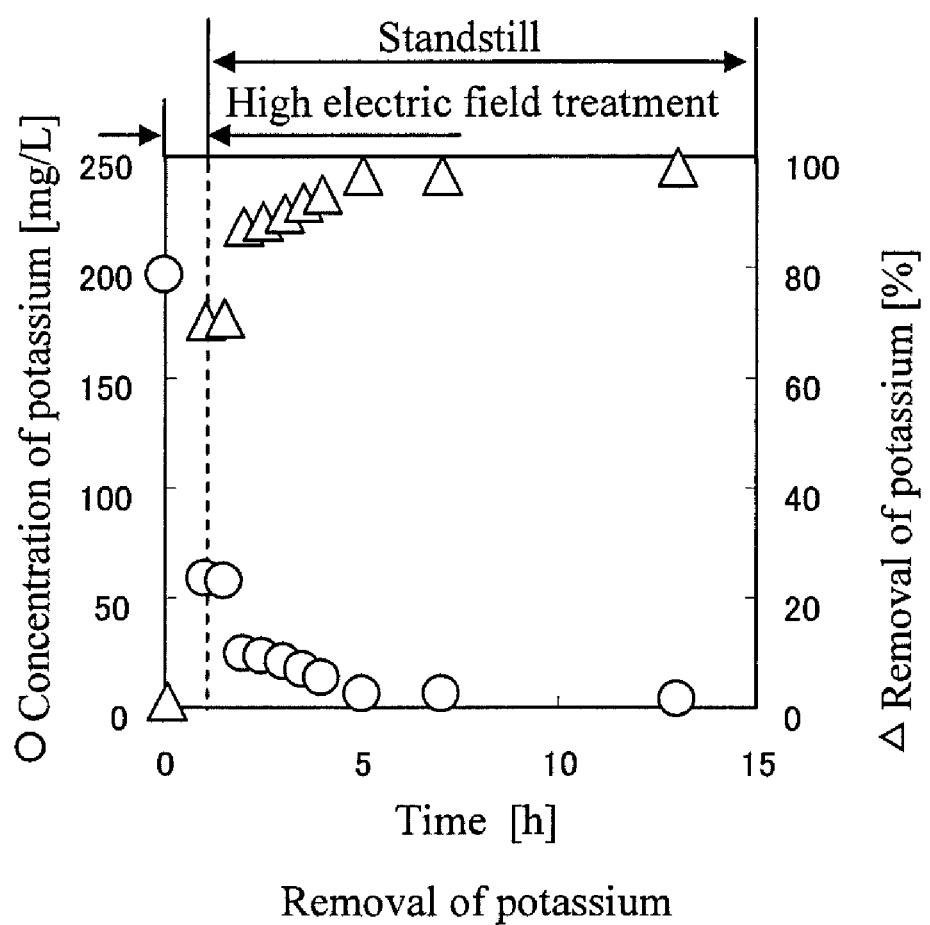
FIG. 10 is a graph showing the timecourse and removal of potassium when an high electric field is applied for one hour to a biodiesel fuel and allowed the fuel to stand for 12 hours.
Figure 11:
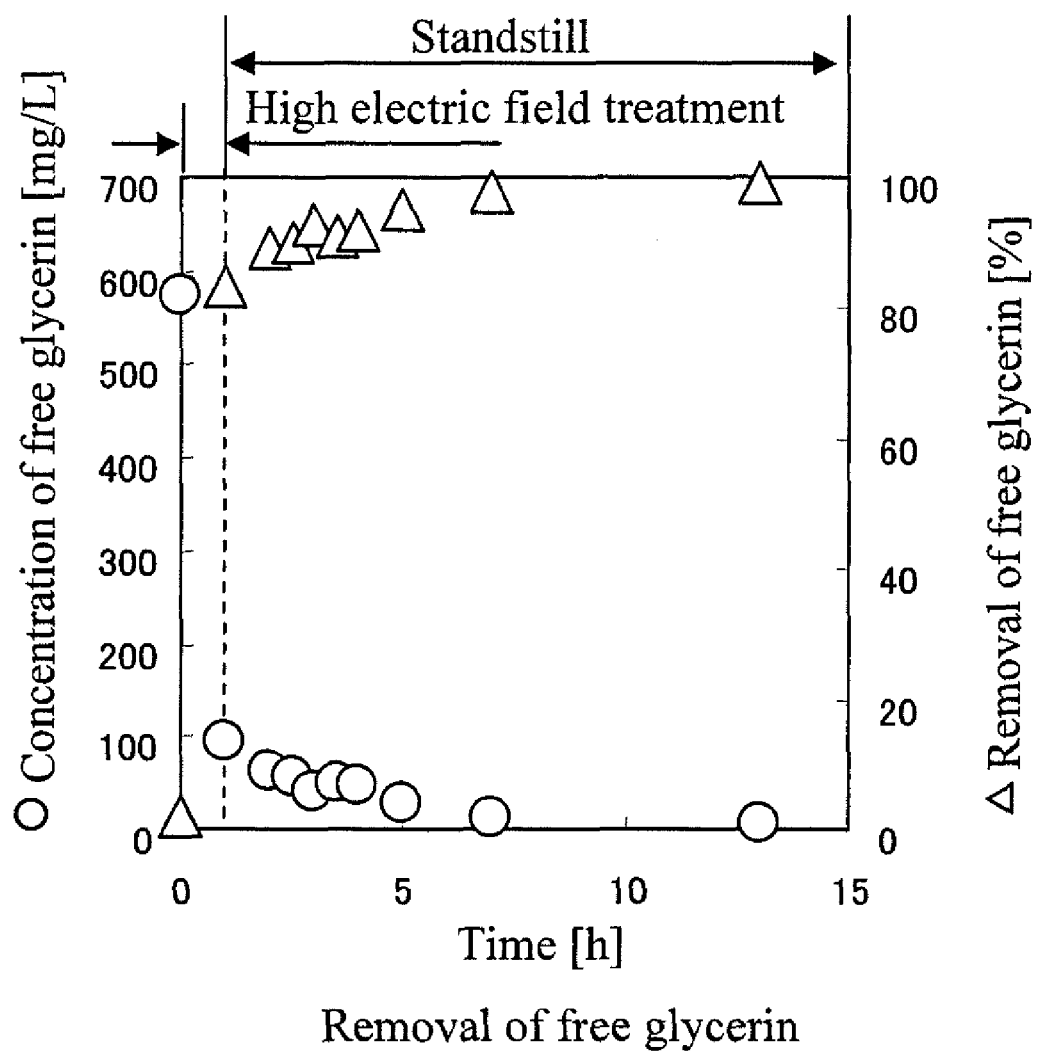
FIG. 11 is a graph showing the timecourse and removal of free glycerin when an high electric field is applied for one hour to a biodiesel fuel and allowed the fuel to stand for 12 hours.

As a result, as shown in FIGS. 9 to 11, the removal of each of the impurities was high at one-hour application of a high electric field. The removal of methanol, potassium and free glycerin reached 63.6%, 70.2% and 83.4%, respectively.

The removal of impurities was further improved by allowing the emulsion to stand still for 12 hours after one-hour application of a high electric field. Finally, the removal of methanol, potassium and free glycerin reached as high as 99.6%, 98.1% and 99.0%, respectively. The final concentrations of methanol, potassium and free glycerin reached 1 mg/L, 3.7 mg/L and 6 mg/L, respectively.

Example 4

Figure 12:
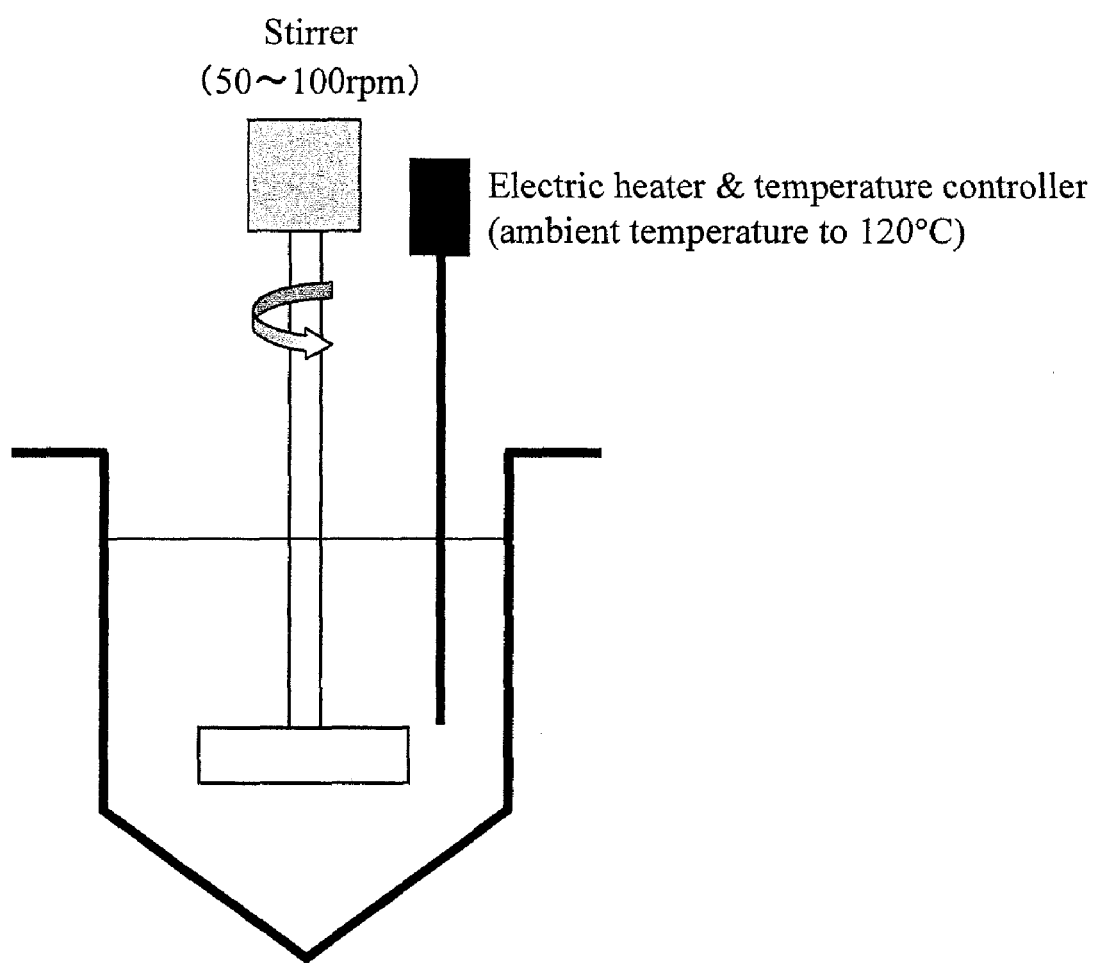
FIG. 12 shows a schematic illustration of an apparatus for use in heat treatment.

First, 998.5 mL of a crude biodiesel fuel (methanol: 5270 mg/L, potassium: 85.9 mg/L, free glycerin: 863 mg/L, moisture content: 0.069 v/v %), which was produced from waste edible oil (salad oil) by a transesterification method (using methanol and potassium hydroxide), and 1.5 mL of pure water were placed in a glass bottle and stirred at 1500 rpm to form emulsion. Immediately upon emulsion formation, the emulsion was transferred to the glass container shown in FIG. 12, heated at 90° C. for 8 hours while stirring at 30 rpm. As a result, the removal effects of methanol, free glycerin and potassium were confirmed. Furthermore, the waste-liquid demulsified was discharged from the bottom of the container, and then, 1.5 mL of pure water was added. The mixture was stirred at 1500 rpm to form emulsion, again. Immediately upon emulsion formation, the emulsion was heated at 90° C. for 8 hours while stirring at 30 rpm. As a result, as shown in Table 1, methanol was removed to 27.4 mg/L, free glycerin to 14.6 mg/L and potassium to 2.00 mg/L.

TABLE 1

| | Impurity concentration | | | |
|---|---|---|---|---|
| Treatment | Moisture content (%) | Methanol (mg/L) | Glycerin (mg/L) | Potassium (mg/L) |
| Untreated | 0.069 | 5270 | 863 | 85.9 |
| Primary demulsification | 0.025 | 114 | 73.4 | 6.70 |
| Secondary demulsification | 0.026 | 27.4 | 14.6 | 2.00 |

Note that analysis for potassium of the oil phase after treatment was performed by dissolving the oil after treatment with methanol to prepare a sample solution, which was measured by flame atomic absorption spectrometry. The methanol and free glycerin of the oil phase were analyzed by a gas chromatograph mass spectrometer. The pretreatment was performed in accordance with a method of Mittelbach et al. (Mittelbach et al., Chromatographia, 42, 431 (1996)). The moisture content of the oil phase was analyzed by a Karl-Fischer moisture meter.

Example 5

First, 990 mL of a crude biodiesel fuel (methanol: 5270 mg/L, potassium: 85.9 mg/L, free glycerin: 863 mg/L, moisture content: 0.069 v/v %), which was produced from waste edible oil (salad oil) by a transesterification method (using methanol and potassium hydroxide), and 10 mL of an aqueous solution of magnesium nitrate or magnesium hydrogenphosphate (magnesium concentration: 110 mmol/L) were placed in a glass bottle and the mixture was stirred at 1500 rpm to form emulsion. Immediately upon emulsion formation, the emulsion was transferred to the glass container shown in FIG. 12, heated at 90° C. for 6 hours while stirring at 30 rpm. As a result, as shown in Table 2, the concentration of potassium was less than 5 mg/L, methanol less than 2000 mg/L and free glycerin less than 200 mg/L. Removal of impurities was successively performed even if any type of demulsifier was used. The concentration of magnesium in the oil phase after treatment was less than 5 mg/L. It was satisfactory results.

Note that potassium and magnesium contained in the oil phase after treatment were analyzed by dissolving the oil after treatment with methanol to prepare a sample solution, which was measured by flame atomic absorption spectrometry. The methanol and free glycerin of the oil phase were analyzed by a gas chromatograph mass spectrometer. The pretreatment was performed in accordance with a method of Mittelbach et al. (Mittelbach et al., Chromatographia, 42, 431 (1996)). The moisture content of the oil phase was analyzed by a Karl-Fischer moisture meter.

Example 6

First, 990 mL of a crude biodiesel fuel (methanol: 12200 mg/L, potassium: 70.8 mg/L, free glycerin: 627 mg/L, moisture content: 0.072 v/v %), which was produced from waste edible oil (salad oil) by a transesterification method (using methanol and potassium hydroxide), and 10 mL of an aqueous solution of magnesium phosphate or magnesium chloride (magnesium concentration: 90.8 mmol/L) were placed in a glass bottle and the mixture was stirred at 1500 rpm to form emulsion. Immediately upon emulsion formation, the emulsion was transferred to the glass container shown in FIG. 12, heated at 90° C. for 6 hours while stirring at 30 rpm. As a result, as shown in Table 2, the concentration of potassium was less than 5 mg/L, methanol less than 2000 mg/L and free glycerin less than 200 mg/L. Removal of impurities was successively performed even if any type of demulsifier was used. The concentration of magnesium in the oil phase after treatment was less than 5 mg/L. It was satisfactory results.

Note that potassium and magnesium contained in the oil phase after treatment were analyzed by dissolving the oil after treatment with methanol to prepare a sample solution, which was measured by flame atomic absorption spectrometry. The methanol and free glycerin of the oil phase were analyzed by a gas chromatograph mass spectrometer. The pretreatment was performed in accordance with a method of Mittelbach et al. (Mittelbach et al., Chromatographia, 42, 431 (1996)). The moisture content of the oil phase was analyzed by a Karl-Fischer moisture meter.

TABLE 2

| Sample | Demulsifier | Impurity concentration | | | | |
|---|---|---|---|---|---|---|
| | | Moisture content % | Potassium mg/L | Methanol mg/L | Glycerin mg/L | Magnesium mg/L |
| Untreated | Mg(NO$_3$)$_2$ | 0.069 | 85.9 | 5270 | 863 | 0.169 |
| Treated | | 0.022 | 1.85 | 85.0 | 153 | 0.980 |
| Untreated | MgHPO$_4$ | 0.069 | 85.9 | 5270 | 863 | 0.085 |
| Treated | | 0.017 | 2.65 | 55.0 | 16.4 | 0.080 |
| Untreated | Mg$_3$(PO$_4$)$_2$ | 0.072 | 70.8 | 12200 | 627 | 0.140 |
| Treated | | 0.025 | 1.72 | 114 | 28.2 | 0.450 |
| Untreated | MgCl$_2$ | 0.072 | 70.8 | 12200 | 627 | 0.270 |
| Treated | | 0.023 | 2.20 | 21.7 | 173 | 4.37 |

All publications, patents and patent applications cited herein are incorporated in the present specification by references in its entirety.

INDUSTRIAL APPLICABILITY

The invention is used in the field of a biodiesel fuel.

The invention claimed is:

1. A method for purifying a biodiesel fuel, comprising the steps of:
    subjecting a raw oil and methanol to transesterification using an alkaline catalyst to obtain a crude biodiesel fuel comprising methanol, alkali metals and free glycerin,
    applying an electric field to the crude biodiesel fuel obtained by transesterification using the alkaline catalyst, and
    separating a fuel phase and a waste-liquid phase after the application of the electric field to obtain a purified biodiesel fuel.

2. The method according to claim 1, wherein the electric field is applied at an electric-field intensity of 0.01 to 5 kV/cm.

3. The method according to claim 1, wherein the electric field is applied at an electric-field intensity of 0.1 to 2.5 kV/cm.

4. The method according to claim 1, wherein the crude biodiesel fuel comprises methanol in an amount of 100 to 3500 mg/L.

5. The method according to claim 1, wherein the crude biodiesel fuel comprises alkali metals in an amount of 5 to 200 mg/L.

6. The method according to claim 1, wherein the crude biodiesel fuel comprises free glycerin in an amount of 200 to 800 mg/L.

7. The method according to claim 1, which comprises adding water to the crude biodiesel fuel to form W/O emulsion before the electric field is applied, followed by applying the electric field to break the emulsion.

8. The method according to claim 7, wherein the electric field is applied at an electric-field intensity of 0.01 to 5 kV/cm.

9. The method according to claim 7, wherein the electric field is applied at an electric-field intensity of 0.1 to 2.5 kV/cm.

10. The method according to claim 7, wherein the crude biodiesel fuel comprises methanol in an amount of 100 to 3500 mg/L.

11. The method according to claim 7, wherein the crude biodiesel fuel comprises alkali metals in an amount of 5 to 200 mg/L.

12. The method according to claim 7, wherein the crude biodiesel fuel comprises free glycerin in an amount of 200 to 800 mg/L.

* * * * *